United States Patent [19]

Khanna et al.

[11] 4,276,212

[45] Jun. 30, 1981

[54] HIGH SOLIDS COATING COMPOSITION OF A LOW MOLECULAR WEIGHT ACRYLIC POLYMER AND AN ALKYLATED MELAMINE CROSS-LINKING AGENT

[75] Inventors: Ram-Tirth Khanna, Wilmington, Del.; Robert L. Turner, Troy, Mich.

[73] Assignee: E. I. Du Pont de Nemours and Company, Wilmington, Del.

[21] Appl. No.: 128,113

[22] Filed: Mar. 7, 1980

Related U.S. Application Data

[63] Continuation-in-part of Ser. No. 968,364, Dec. 11, 1978, abandoned, which is a continuation of Ser. No. 807,735, Jun. 17, 1977, abandoned, which is a continuation-in-part of Ser. No. 600,367, Jul. 30, 1975, abandoned.

[51] Int. Cl.$^3$ .................. C08L 31/00; C08L 33/14; C08L 61/28
[52] U.S. Cl. ................... 260/39 R; 260/15; 260/32.8 R; 260/33.4 R; 525/162; 525/384; 525/509
[58] Field of Search ............ 525/162, 384, 509; 260/33.9 R

[56] References Cited

U.S. PATENT DOCUMENTS

| | | |
|---|---|---|
| 2,681,897 | 6/1954 | Frazier et al. |
| 2,878,237 | 3/1959 | Russell et al. |
| 3,267,174 | 8/1966 | Fry et al. |
| 3,352,806 | 11/1967 | Hicks |
| 3,540,917 | 11/1970 | Seifer et al. |
| 3,622,651 | 11/1971 | Vasta |
| 3,637,546 | 1/1972 | Parker |
| 3,841,895 | 10/1974 | Hick |
| 4,102,943 | 7/1978 | Isaksen et al. |

FOREIGN PATENT DOCUMENTS 856347 11/1970 Canada.

OTHER PUBLICATIONS

Encyclopedia of Chemical Technology, Kirkothmer, Interscience, 1963, vol. 1, p. 305.
Rohm & Haas Company Bulletin, pp. 1–4, "Experimental Resin QR–528H."
Rohm & Haas Company Bulletin, "Experimental Resin QR–542."
Modern Paint and Coatings, Mar. 1975, pp. 23–28, "Acrylic Resins: Familiar Technology: Effective Coatings."
Rohm & Haas Company Bulletin C–398, Apr. 1975, "Acryloid OL–42 Acrylic Oligomer For High Solids Coatings."
Industrial Finishing, May 1975, pp. 25–27, "High Solids Acrylic Coatings."

*Primary Examiner*—Allan Lieberman

[57] ABSTRACT

The high solids coating composition contains at least 50% by weight of a binder of film-forming constituents in which the constituents are of (A) an acrylic polymer that has a number average molecular weight of about 500–4,500, a hydroxyl content of at least 2% by weight, a glass transition temperature of about −20° C. to +20° C. and optionally contains a chain transfer agent, and is of
an alkyl methacrylate,
a hydroxy alkyl acrylate or
a hydroxy alkyl methacrylate,
and optionally, an alkyl
acrylate or styrene
(B) an alkylated melamine formaldehyde cross-linking agent;

the composition is particularly useful as an exterior finish for automobiles, trucks, airplanes and can be used as an appliance finish and for coil coatings.

25 Claims, No Drawings

HIGH SOLIDS COATING COMPOSITION OF A LOW MOLECULAR WEIGHT ACRYLIC POLYMER AND AN ALKYLATED MELAMINE CROSS-LINKING AGENT

CROSS REFERENCE TO RELATED APPLICATIONS

This application is a continuation-in-part of Ser. No. 968,364 filed Dec. 11, 1978, now abandoned which is a continuation of application Ser. No. 807,735 filed June 17, 1977, now abandoned, which is a continuation-in-part of application Ser. No. 600,367 filed July 30, 1975, now abandoned.

BACKGROUND OF THE INVENTION

This invention is related to high solids coating compositions, in particular, to high solids acrylic coating compositions.

Acrylic coating compositions that are crosslinked with melamine resins are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972 and Parker U.S. Pat. No. 3,637,546, issued Jan. 25, 1972. These patents illustrate high quality coating compositions. However, these compositions have a relatively high solvent content to provide for good application properties and good properties of the resulting dried finish. To utilize these compositions in areas which have strict air pollution regulations, pollution abatement equipment is required. This equipment is expensive and it increases capital investment of a plant and is costly to operate. Any attempt to reduce the solvent content of these compositions generally results in finishes which have either a poor appearance or unacceptable properties or both.

There is a great need for a coating composition that has a low solvent content and that can be utilized without pollution abatement equipment but still provides a high quality finish which is useful as an exterior finish for automobiles, trucks, airplanes and as an appliance finish. The high solids coating composition of this invention has these desirable characteristics.

SUMMARY OF THE INVENTION

The high solids coating composition comprises at least 50% by weight of a binder of film-forming constituents and up to 50% by weight of a non-aqueous liquid carrier; in which the film-forming constituents consist essentially of (A) about 50–95% by weight of an acrylic polymer having a number average molecular weight determined by gel permeation chromatography of about 500–4,500, a hydroxyl content of about 2%–10% by weight, a glass transition temperature of about −20° C. to +20° C. and optionally, contains a chain transfer agent, and the acrylic polymer consists essentially of an alkyl methacrylate that has 1–18 carbon atoms in the alkyl group, a hydroxy alkyl acrylate, or a hydroxy alkyl methacrylate each having 2–4 carbon atoms in the alkyl group, and optionally, an alkyl acrylate that has 2–18 carbons in the alkyl group or styrene and (B) 5–50% by weight of alkylated melamine formaldehyde cross-linking agent having 1–4 carbon atoms in the alkyl group.

DESCRIPTION OF THE INVENTION

The high solids coating composition has a binder content of film-forming constituents of at least 50% by weight. Generally, the composition has a binder content of about 60–85%. The remainder of the constituents in the composition is a liquid carrier which generally is a solvent for the binder. In addition, the composition optionally contains about 0.1–30% by weight, based on the weight of the binder, of pigment.

The binder or film-forming constituents used in the coating composition comprise about 50–95% by weight of an acrylic polymer and 5–50% by weight of an alkylated melamine formaldehyde cross-linking agent. For most uses, the composition contains about 65–75% by weight of the acrylic polymer and 25–35% by weight of an alkylated melamine formaldehyde cross-linking agent.

The acrylic polymer utilized in the coating composition is prepared by solution polymerization in which the monomers are blended with a solvent, polymerization catalyst and optionally, a chain transfer agent, and heated to about 75°–150° C. for 2–6 hours to form a polymer that has a number average molecular weight of about 500–4,500, a hydroxyl content of 2–10% by weight and a glass transition temperature of about −20° C. to +20° C. Generally, acrylic polymers having a number average molecular weight of about 1,000–3,500 are prepared and used in the composition.

To form films that have acceptable physical properties from low molecular weight acrylic polymers, the polymers must have a hydroxyl content that is about two to three times higher than acrylic polymers used for conventional thermosetting compositions. The higher hydroxyl content provides additional crosslinking sites and films are formed that have excellent physical properties that are equivalent to and often better than films formed from conventional thermosetting acrylic compositions.

Both the above number average molecular weight and the weight average molecular weight (mentioned hereinafter) are determined by gel permeation chromatography.

The glass transition temperature of the polymer is determined by differential scanning colorimetry or is calculated.

One technique that is successfully used in preparing the low molecular weight acrylic polymers is a programmed addition of monomers, solvent catalyst solution and optionally, a chain transfer agent into a polymerization vessel at a given rate. These programmed additions can be manually calculated or calculated by a computer. This allows for the polymerization of low molecular weight acrylic polymers. Optionally, the polymers can be terminated with the chain transfer agent at the desired low molecular weight. Also, after the polymerization is completed solvents can be stripped off to increase the polymer solids content of the resulting polymer solution.

Typical solvents which are used to prepare the acrylic polymer are the following: toluene, ethyl acetate, acetone, methyl isobutyl ketone, methylethyl ketone, ethyl alcohol, tert.butyl peracetate, mineral spirits, ethylene glycol monoether acetate, and other aliphatic, cycloaliphatic and aromatic hydrocarbon, esters, ethers, ketones and alcohols which are conveniently used.

About 0.1–4% by weight, based on the weight of the monomers, of the polymerization catalyst is used to prepare the acrylic polymer. Typical catalysts are: azo-bis-isobutyronitrile, azo-bis-(α-gamma dimethyl valeronitrile), benzoyl peroxide, t-butyl pivalate and the like.

A chain transfer agent can be used to control the molecular weight of the acrylic polymer. Typical chain transfer agents are 2-mercapto ethanol, dodecyl mercaptan, benzene thioethanol, mercapto succinic acid, butyl mercaptan, mercapto propionic acid and the like. When a transfer agent is used, the resulting acrylic polymer contains about 2–10% by weight of a chain transfer agent. Under certain polymerization conditions polymers containing 0.5–5% by weight of a chain transfer agent can be formed.

The acrylic polymer used in the high solids coating composition is of an alkyl methacrylate that has 1–18 carbon atoms in the alkyl group, and an alkyl acrylate that has 2–18 carbon atoms in the alkyl group and a hydroxy alkyl acrylate or a hydroxy alkyl methacrylate each having 2–4 carbon atoms in the alkyl group. To form an acrylic polymer which has a hydroxyl content of about 2–10% by weight, a sufficient amount of the aforementioned hydroxy alkyl acrylate or methacrylate is utilized. The polymer also can contain small amounts of α,β-ethylenically unsaturated carboxylic acid, such as acrylic acid, methacrylate acid, itaconic acid, in amounts of about 0.1–5% by weight.

Typical alkyl methacrylates and acrylates that can be used to prepare the acrylic polymer are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, propyl acrylate, phenyl acrylate, isobornyl acrylate and the like.

Adhesion promoting monomers can also be used in the acrylic polymer such as diethyl aminoethyl methacrylate, tertiary butyl aminoethyl methacrylate, 3-(2-methacryloxy ethyl)-2,2-spiro cyclohexyl oxazolidene and the like.

Typical hydroxy alkyl acrylates and methacrylates which can be used to prepare the acrylic polymer are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

The acrylic polymer can contain about 0.1–30% by weight of other constituents such as styrene or substituted styrene, such as methyl styrene, acrylonitrile, methacrylonitrile, acrylamide and methacrylamide.

One useful acrylic polymer is of 15–82% by weight of an alkyl methacrylate that has 1–4 carbon atoms in the alkyl group, 2–50% by weight of an alkyl acrylate that has 2–12 carbon atoms in the alkyl group and 16–35% by weight of a hydroxyl alkyl acrylate or a hydroxyl alkyl methacrylate each having 2–4 carbon atoms in the alkyl group.

One particularly useful acrylic polymer of the aforementioned type is of about 60–80% by weight of methyl methacrylate, 2–10% by weight of 2-ethylhexyl acrylate, and 18–30% by weight of hydroxy ethyl acrylate. An example of one useful acrylic polymer of the aforementioned type is of 71% by weight of methyl methacrylate, 4% by weight of 2-ethylhexyl acrylate, and 25% by weight of hydroxy ethyl acrylate.

The following are examples of other useful acrylic polymers: 25–65% by weight of methyl methacrylate, 15–40% by weight of butyl acrylate, 20–35% by weight of hydroxy ethyl acrylate; 50% by weight of methyl methacrylate, 20% by weight of butyl acrylate and 30% by weight of hydroxy ethyl acrylate; 35% by weight of methyl methacrylate, 35% by weight of butyl acrylate and 30% by weight of hydroxy ethyl acrylate; 30% methyl methacrylate, 38% butyl acrylate and 32% hydroxy ethyl acrylate; 6% methylmethacrylate, 64% ethyl hexyl methacrylate, 30% hydroxy ethyl acrylate; 36% methyl methacrylate, 34% lauryl methacrylate, 30% hydroxy ethyl acrylate; and 10% methyl methacrylate, 60% butyl methacrylate and 30% hydroxy ethyl acrylate.

One particularly useful styrene containing polymer comprises about 10–20% by weight styrene, 10–20% by weight methyl methacrylate, 35–48% by weight butyl acrylate, 20–30% by weight hydroxyl ethyl acrylate and 0.1–5% by weight of acrylic acid. One preferred acrylic polymer of the above type contains about 16% styrene, 15.8% methyl methacrylate, 43% butyl acrylate, 25% hydroxy ethyl acrylate and 0.2% acrylic acid.

Optionally, in addition to the above film-forming constituents, about 1–10% by weight, based on the weight of the film-forming constituents of the composition, of cellulose acetate butyrate can be used in the composition. Cellulose acetate butyrate that has a butyryl content of about 25–60% by weight and a viscosity of about 0.01–2 seconds measured according to ASTM-D-1343-56 at 25° C. can be utilized.

Also, in addition to the above film-forming constituents, plasticizers in the amounts of 0.1–10% by weight, based on the weight of the film-forming constituents, can be used in the composition. Plasticizers that can be used are, for example, butyl benzyl phthalate, dibutyl phthalate, triphenyl phosphate, 2-ethylhexyl benzyl phthalate, dicyclohexyl phthalate, diallyl phthalate, dibenzyl phthalate, butylcyclohexyl phthalate, mixed benzoic acid and fatty oil acid esters of pentaerythritol, poly-(propylene adipate)dibenzoate, diethylene glycol dibenzoate, tetrabutylthiodisuccinate, butylphthalylbutyl glycolate, acetyltributyl citrate, dibenzylsebacate, tricresyl phosphate, toluene ethyl sulfonamide, and dimethylene cyclohexyl phthalate.

The composition can contain in addition from about 0.5–15% by weight, based on the weight of the composition, of a polyhydroxy functional compound which is a solvent for the film-forming constituents and reduces the application viscosity of the composition and will be cross-linked into a resulting finish prepared from the composition. Typical polyhydroxy functional compounds that are useful are trimethylol ethane, trimethylol propane, trimethylol butane, trimethyl pentanediol, pentaerythritol, pentanediol, diethylene glycol, dipropylene glycol, triethylene glycol, 2-ethyl-1,3-hexane diol, triproylene glycol, butanediol and the like. Low molecular weight hydroxyl terminated polyesters can be used such as a polyester of trimethyl pentanediol and isophthalic acid, a polyester of trimethyl pentanediol and a mixture of dimethyl aliphatic carboxylates.

The alkylated melamine formaldehyde resin used in the composition generally has 1-4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. One preferred resin which gives a high quality finish is hexamethoxymethyl melamine. One typical resin of the preferred type is "Cymel" 303. Another useful resin is a methoxy/butoxymethyl melamine.

One useful composition contains as the film forming binder contains about 60-70% by weight, based on the weight of the binder, of an acrylic polymer of 5-15% by weight styrene, 10-20% by weight methyl methacrylate, 33-43% by weight butyl acrylate, 27-38% by weight hydroxy ethyl acrylate and 0.1-3% by weight acrylic acid and 30-40% by weight, based on the weight of the binder of methoxy/butoxymethyl melamine.

As mentioned before, the composition can contain pigments. These pigments can be introduced into the composition by first forming a mill base with the acrylic polymer utilized in the composition or with other compatible polymers by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition. Examples of typical pigments that can be used are as follows: metallic oxide, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

An acid catalyst solution can be added to the composition to increase the rate of cross-linking of the composition on curing. Generally, about 0.1-2% by weight, based on the weight of the film-forming constituents, of acid catalyst is used. For example, phosphoric acid or an alkyl acid phosphate in which the alkyl group has 1-2 carbon atoms can be utilized for this purpose. Typical alkyl acid phosphates are methyl acid phosphate, ethyl acid phosphate, propyl acid phosphate, lauryl acid phosphate, and the like. Sulfonic acid or a substituted sulfonic acid can be used such as para-toluene sulfonic acid.

Adducts of the aforementioned acids also can be used as catalysts. For example, epoxy resins reacted with phosphoric acid or an alkyl acid phosphate or with a substituted sulfonic acid such as paratoluene sulfonic acid are useful. Typical epoxy resins that can be used to form these adducts are "Epon" 828, 1001, 1002, 1003, 1004 which are the condensation products of epichlorohydrin and bisphenol A. Other compounds can be used to form adducts of these acids such as alkyl oxazolidine e.g. dimethyl oxazolidine.

The coating composition of this invention can be applied over a variety of substrates, such as metal, wood, glass, plastics, and the like, by any of the conventional application methods, such as spraying electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 65°-140° C. for about 15 minutes-2 hours. The resulting coating is about 0.1-5 mils thick but for most uses, a 1-3 mil thick coating is used. One technique that is used to insure that there will be no popping or cratering of the coating is to allow the solvents to flash off for about 15-30 seconds before a second coating is sprayed on or otherwise applied, then waiting from about 2-10 minutes before baking the coating to allow any residual solvents to flash off. The resulting coating has good gloss and can be rubbed or polished with conventional techniques to improve the smoothness or appearance or gloss or both. The coating has good adhesion to substrates of all types, is hard and resistant to weathering, solvents, alkali, scratches and the like. These characteristics make the composition particularly useful as a finish for automobiles, trucks, airplanes, railroad equipment and for the repair of trucks and automobiles. The composition can also be used on appliances, vending machines, outdoor equipment such as bridges, water tanks, gas tanks and the like.

One particular use for the composition is that it can be used to repair powder coating finishes, in particular powder coating finishes which are pigmented with flake pigments, such as aluminum flake pigments. Excellent matches between the finish from the powder coating and the finish of the novel composition are achieved which makes the composition particularly useful as a repair composition.

The following Examples illustrate the invention. All quantities are shown on a weight basis unless otherwise indicated.

EXAMPLE 1

An Acrylic polymer solution is prepared by charging the following constituents into a polymerization vessel equipped with a thermometer, stirrer, reflux condenser, additional funnel, and a heating mantle:

|  | Grams |
|---|---|
| Portion 1 |  |
| Methyl methacrylate monomer | 576.600 |
| 2-Ethylhexyl acrylate monomer | 58.400 |
| 2-Hydroxy ethyl acrylate monomer | 201.200 |
| Methylethyl ketone | 546.700 |
| 2-Mercapto ethanol | 58.400 |
| Portion 2 |  |
| Azo-bis-isobutyronitrile | 0.003 |
| Total | 1441.303 |

Portion 1 is heated to its reflux temperature with constant agitation, and Portion 2 is added.

A monomer solution and a solvent catalyst solution are prepared as follows:

|  | Grams |
|---|---|
| Monomer Solution |  |
| Methyl methacrylate monomer | 753.90 |
| 2-Ethylhexyl acrylate monomer | 18.20 |
| 2-Hydroxyethyl acrylate monomer | 267.20 |
| 2-Mercapto ethanol | 31.35 |
| Total | 1070.65 |
| Solvent Catalyst Solution |  |
| Azo-bis-isobutyronitrile | 24.13 |
| Methylethyl ketone | 464.00 |

| | Grams |
|---|---|
| Total | 488.13 |

The above prepared monomer solution and solvent catalyst solution are added to the polymerization vessel over the time period indicated below while the constituents in the vessel are maintained at a reflux temperature.

The following table shows the time over which each of the additions of monomer and solvent catalyst solution is made to the polymerization vessel:

| Time Interval From Start of Reaction (Minutes) | Monomer Solution (Cubic Centimeters) | Solvent Catalyst Solution (Cubic Centimeters) |
|---|---|---|
| 0–5 | 18 | 3 |
| 5–10 | 0 | 0 |
| 10–15 | 0 | 0 |
| 15–20 | 25 | 0 |
| 20–25 | 10 | 1 |
| 25–30 | 15 | 7 |
| 30–35 | 45 | 29 |
| 35–40 | 53 | 36 |
| 40–45 | 62 | 35 |
| 45–50 | 60 | 40 |
| 50–55 | 90 | 40 |
| 55–60 | 0 | 35 |
| 60–65 | 55 | 30 |
| 65–75 | 100 | 90 |
| 70–75 | 120 | 60 |
| 85–90 | 75 | 35 |
| 90–95 | 30 | 5 |
| 95–105 | 10 | 5 |
| 105–910 | 0 | 4 |
| 110–120 | 0 | 11 |
| 120–130 | 55 | 0 |
| 130–135 | 20 | 10 |
| 135–140 | 30 | 35 |
| 140–145 | 5 | 0 |
| 145–160 | 55 | 0 |
| 160–190 | 70 | 20 |
| 190–210 | 0 | 16 |
| 210–220 | 15 | 4 |
| 220–240 | 0 | 7 |
| 240–250 | 20 | 8 |
| 250–260 | 6 | 1 |
| 260–270 | 0 | 6 |
| 270–280 | 19 | 2 |
| 280–300 | 20 | 11 |

After the above constituents are added, the resulting polymerization mixture is maintained at its reflux temperature for an additional 20 minutes and cooled to room temperature. The resulting polymer solution had a solids content of 64.3%.

The polymer is of methyl methacrylate/2-ethylhexyl acrylate/2-hydroxy ethyl acrylate in a weight ratio of 71/4/25. The polymer has a number average molecular weight of 1800 and a weight average molecular weight of 3400 determined by gel permeation chromatography and a hydroxyl content of 4.49% and a glass transition temperature of about 13° C. determined by differential scanning colorimetry and contains 5.1% by weight of mercapto ethanol chain transfer agent.

By thoroughly blending together the following constituents, a coating composition is prepared:

| | Grams |
|---|---|
| Trimethylol propane | 4.50 |
| "Cymel" 303 (hexamethoxymethyl melamine) | 14.30 |
| Acrylic polymer solution (prepared above) | 35.80 |
| Paratoluene sulfonic acid solution (50% solids paratoluene sulfonic acid dissolved in acetone) | 0.84 |
| Total | 55.44 |

The composition is sprayed onto phosphatized steel panels and baked for 60 minutes at 105° C. The resulting finish is smooth and glossy and has a good appearance and has a Knoop hardness of about +17.

A second coating composition is prepared by blending together the following constituents:

| | Grams |
|---|---|
| "Cymel" 303 (hexamethoxymethyl melamine) | 14.3 |
| Acrylic polymer solution (prepared above) | 71.8 |
| Paratoluene sulfonic acid solution (described above) | 1.2 |
| Total | 87.3 |

The composition is sprayed onto phosphatized steel panels and baked for 60 minutes at 105° C. to give a finish which is smooth and glossy and has a good appearance and has a Knoop hardness of about 12.

EXAMPLE 2

A paint is formulated by blending together the following constituents:

| | Grams |
|---|---|
| Trimethylol propane solution (50% solids in methanol) | 18.97 |
| Acrylic polymer solution (prepared in Example 1) | 76.20 |
| "Cymel" 303 (hexamethoxymethyl melamine) | 40.18 |
| Paratoluene sulfonic acid solution (described in Example 1) | 2.00 |
| White mill base (42.2% dispersed titanium dioxide pigment, 21.1% of a polymer of methyl methacrylate/lauryl methacrylate/2-hydroxy ethyl acrylate and 36.7% of an organic solvent) | 22.70 |
| Yellow mill base (42.2% of ferrite yellow orange pigment, 21.1% of a polymer of methyl methacrylate/lauryl methacrylate/2-hydroxy ethyl acrylate and 36.7% of an organic solvent) | 5.10 |
| Green mill bases (12.4% phthalocyanine green pigment, 20.2% of a polymer of methyl methacrylate/lauryl methacrylate/2-hydroxy butyl methacrylate, 12.7% cellulose acetate butyrate, 55% butyryl content and a 0.2 second viscosity, 1.3% butylbenzyl phthalate and 54.4% of an organic solvent) | 1.80 |
| Black mill base (3.8% Peerless 155 carbon black pigment, 16.1% of a polymer of methyl methacrylate/lauryl methacrylate/2-hydroxy ethyl methacrylate, 12.4% cellulose acetate butyrate having a 55% butyryl content and a 0.02 second viscosity, 3% of a dispersant polymer having a weight average molecular weight of about 9,000 and is of 92.5% methyl methacrylate, and 7.5% lauryl methacrylate and is terminated | |

-continued

|  | Grams |
|---|---|
| with 2-mercapto ethanol which is reacted with an organic polyisocyanate and the isocyanate groups are reacted with ammonia and 64.7% of an organic solvent) | 1.90 |
| Total | 168.85 |

The above paint is sprayed onto steel panels primed with an alkyd resin primer and baked for 30 minutes at 135° C. to give a finish which has a good appearance, good gloss and has a Knoop hardness of about 10-14.

EXAMPLE 3

An acrylic polymer solution is prepared by charging the following constituents into a polymerization vessel equipped as in Example 1:

|  | Grams |
|---|---|
| Methyl methacrylate monomer | 214.75 |
| n-Butyl acrylate monomer | 394.48 |
| 2-Hydroxyethyl acrylate monomer | 184.97 |
| Methylethyl ketone | 420.47 |
| 2-Mercapto ethanol | 40.29 |
| Total | 1254.36 |

The constituents are heated to a reflux temperature of about 97° C.

A monomer solution and a solvent catalyst solution are prepared as follows:

|  | Grams |
|---|---|
| Monomer Solution |  |
| Methyl methacrylate monomer | 273.14 |
| n-Butyl acrylate monomer | 96.57 |
| 2-Hydroxyethyl acrylate monomer | 232.75 |
| 2-Mercapto ethanol | 27.59 |
| Total | 630.05 |
| Solvent Catalyst Solution |  |
| Methylethyl ketone | 82.28 |
| Azo-bis-isobutyronitrile | 5.64 |
| Total | 87.92 |

The above prepared monomer solution and solvent catalyst solution are added to a polymerization vessel over the time indicated below while the constituents in the vessel are maintained at a reflux temperature.

The following table shows the time over which each of the additions of monomer and solvent catalyst solution is made to the polymerization vessel:

| Time Interval from Start of Reaction (Minutes) | Monomer Solution (Cubic Centimeters) | Solvent Catalyst Solution (Cubic Centimeters) |
|---|---|---|
| 0-20 | 115.44 | 9.70 |
| 20-40 | 127.38 | 10.79 |
| 40-60 | 96.21 | 10.78 |
| 60-80 | 72.26 | 10.79 |
| 80-100 | 54.84 | 10.78 |
| 100-120 | 96.78 | 10.79 |
| 120-140 | 32.25 | 10.78 |
| 140-160 | 24.88 | 10.78 |
| 160-180 | 10.45 | 10.79 |
| 180-200 | 10.45 | 10.78 |
| 200-220 | 18.62 | 1.11 |
| 220-240 | 13.72 | 0 |
| 240-260 | 8.40 | 0 |
| 260-280 | 10.79 | 0 |

After the above constituents are added, about 0.2 grams of azo-bis-isobutyronitrile are added and the resulting polymerization mixture is maintained at its reflux temperature for an additional 60 minutes. The resulting polymer solution has a solids content of about 74%.

The polymer is of methyl methacrylate/n-butyl acrylate/2-hydroxyethyl acrylate in a weight ratio of 35/35/30. The polymer has a number average molecular weight of 1700 and a weight average molecular weight of 3400 determined by gel permeation chromatography, a hydroxyl content of 5.2% and a glass transition temperature of 5° C. determined as in Example 1 and a mercapto ethanol content of 4.6%.

A coating composition is prepared by blending the following constituents:

|  | Grams |
|---|---|
| Acrylic Polymer solution (prepared above) | 94.59 |
| "Cymel" 303 (hexamethoxymethyl melamine) | 30.00 |
| Paratoluene sulfonic acid solution (20% paratoluene sulfonic acid in methanol) | 1.00 |
| Total | 125.59 |

The above composition is sprayed onto a steel panel primed with an alkyd resin primer and baked for 30 minutes at 121° C. to give a glossy film of good appearance and having a Knoop hardness of about 11.

Another coating composition is prepared by blending the following constituents:

|  | Grams |
|---|---|
| Acrylic polymer solution (prepared above) | 94.59 |
| "Cymel" 303 (hexamethoxymethyl melamine) | 30.00 |
| Phosphoric acid solution (20% phosphoric acid in methanol) | 5.00 |
| Total | 129.59 |

The above composition is sprayed onto a steel panel primed as above and baked as above to give a glossy film of a good appearance and having a Knoop hardness of about 11.

EXAMPLE 4

The following acrylic polymer solutions were prepared using the same procedure as in Example 1. Each of the polymer solutions has a solids content of about 60% and the acrylic polymers have a weight average molecular weight about 3000 determined as in Example 1, have a hydroxyl content of about 5% and contain about 5% of a mercapto ethanol chain transfer agent.

|  | Acrylic Polymer | Weight Ratio | Glass Transition Temperature |
|---|---|---|---|
| (A) | methyl methacrylate/ ethylhexyl methacrylate/ hydroxy ethyl acrylate | 6/64/30 | −10° C. |
| (B) | methyl methacrylate/ | 36/34/40 | −10° C. |

-continued

| | Acrylic Polymer | Weight Ratio | Glass Transition Temperature |
|---|---|---|---|
| (C) | lauryl methacrylate/ hydroxy ethyl acrylate methyl methacrylate/ butyl methacrylate/ hydroxy ethyl acrylate | 10/60/30 | +10° C. |

Coating compositions are prepared with each of the above acrylic polymer solutions using the second coating composition of Example 1 in which the above acrylic polymer solution is substituted for the acrylic polymer solution of Example 1.

Each of the coating compositions is sprayed onto separate phosphatized steel panels and baked for 60 minutes at 105° C. to provided a smooth, glossy finish having a good appearance and excellent hardness.

EXAMPLE 5

An acrylic polymer solution is prepared by charging the following constituents into a polymerization vessel equipped as in Example 1:

| | Parts by Weight |
|---|---|
| Portion 1 | |
| Styrene monomer | 14.38 |
| Methyl methacrylate monomer | 32.98 |
| n-Butyl acrylate monomer | 147.37 |
| Hydroxy ethyl acrylate monomer | 66.67 |
| Acrylic acid monomer | 0.35 |
| Methyl ethyl ketone | 222.49 |
| 2-Mercapto ethanol | 7.09 |
| Portion 2 | |
| Styrene monomer | 90.18 |
| Methyl methacrylate monomer | 70.18 |
| n-Butyl acrylate monomer | 117.54 |
| Hydroxy ethyl acrylate monomer | 156.14 |
| Acrylic acid monomer | 1.05 |
| Portion 3 | |
| Methyl ethyl ketone | 107.82 |
| Azobisisobutyronitrile | 11.93 |
| Portion 4 | |
| Methyl ethyl ketone | 10.00 |
| Portion 5 | |
| 2-Mercapto ethanol | 26.63 |
| Portion 6 | |
| Methyl ethyl ketone | 5.00 |
| Portion 7 | |
| 2-Mercapto ethanol | 0.20 |
| Total | 1088.00 |

Portion 1 is charged into the polymerization vessel and heated to its reflux temperature. The constituents are under constant agitation in the polymerization vessel during the entire process. Portion 2 is premixed and added at a rate of about 3.6 parts/minute over a 120 minute period while the resulting reaction mixture is held at its reflux temperature. Portion 3 is premixed and added simultaneously with portion 2 at a rate of about 0.83 parts/minute over a 120 minute period. Portion 5 is added simultaneously with portions 2 and 3 at the rate of about 0.22 parts per minute for 60 minutes and then at a rate of about 0.15 parts/minute for 90 minutes. After all of Portion 3 is added, portion 4 is added and after all of portion 5 is added portion 6 is added and the reaction mixture is held at its reflux temperature for an additional 90 minutes. Portion 7 is added and about 188 parts of methyl ethyl ketone are stripped off. The resulting polymer solution is cooled to 50° C. and then filtered.

The polymer is of styrene, methyl methacrylate, n-butyl acrylate, hydroxy ethyl acrylate, acrylic acid in a weight ratio of about 15/14.8/38/32/0.2 and has a number average molecular weight of about 3,000 determined as in Example 1, an acid number of 2.0-5.0 and a hydroxyl content of 5.4% and a glass transition temperature of −8° C. and contains 4.6% by weight of mercapto ethanol chain transfer agent.

A coating composition is prepared by blending the following constituents:

| | Parts by Weight |
|---|---|
| Acrylic polymer solution (prepared above) | 75.0 |
| Melamine resin (methoxy/ butoxy methyl melamine) | 40.0 |
| Acid catalyst solution (20% solids solution in methanol of paratoluene sulfonic acid blocked with dimethyl oxazolidine) | 1.5 |
| | 116.5 |

The above composition is sprayed onto a steel panel primed with an alkyd resin primer and baked for 30 minutes at 120° C. to give a gloss hard film having a good appearance.

EXAMPLE 6

An acrylic polymer solution is prepared by charging the following constituents into a polymerization vessel equipped as in Example 1:

| | Parts by Weight |
|---|---|
| Portion 1 | |
| Ethylene glycol monoether acetate | 1600.0 |
| Portion 2 | |
| Styrene Monomer | 365.0 |
| Methyl methacrylate monomer | 360.0 |
| N-butyl acrylate monomer | 980.0 |
| Hydroxy ethyl acrylate monomer | 570.0 |
| Acrylic acid monomer | 5.0 |
| Tert. butyl per acetate solution (75% solution in mineral spirits) | 49.7 |
| Total | 3929.7 |

Portion 1 is charged into a polymerization vessel and heated to its reflux temperature. Portion 2 is premixed and added at a uniform rate over a 240 minute period while the resulting reaction mixture is held at its reflux temperature. After all of portion 2 is added, the resulting reaction mixture is at its reflux temperature for an additional 45 minutes while about 825 parts of solvent are stripped off of the reaction mixture. The resulting polymer solution is cooled to 50° C. and filtered.

The polymer is of styrene, methyl methacrylate, n-butyl acrylate, hydroxy ethyl acrylate, acrylic acid in a weight ratio of about 16/15.8/43/25/0.2 and the polymer has a number average molecular weight of about 4,000, determined as in Example 1, an acid number of about 2.0-5.0, a hydroxyl content of about 3.8% and a glass transition temperature of about −10° C.

A coating composition is prepared by blending the following constituents:

|  | Parts by Weight |
| --- | --- |
| Acrylic polymer solution (prepared above) | 75.0 |
| Melamine resin (methoxy/ butoxy methyl melamine) | 40.0 |
| Acid catalyst solution (20% solids solution in methanol of paratoluene sulfonic acid blocked with dimethyl oxazolidine) | 1.5 |
|  | 116.5 |

The above composition is sprayed onto a steel panel primed with an alkyd resin primer and baked for 30 minutes at 120° C. to give a glossy hard film having a good appearance.

We claim:

1. A high solids coating composition comprising at least 50% by weight of a binder of film-forming constituents and up to 50% by weight of a liquid carrier; in which the film-forming constituents consist essentially of
   (A) about 50–95% by weight of an acrylic polymer having a number average molecular weight determined by gel permeation chromotography of about 500–4,500, a hydroxyl content of about 2–10% by weight, a glass transition temperature of about −20° C. to +20° C. and containing about 2–10% by weight of a chain transfer agent and consisting essentially of
      methyl methacrylate, an alkyl methacrylate or an alkyl acrylate each having 2–12 carbon atoms in the alkyl groups and a hydroxyl alkyl acrylate or a hydroxy alkyl methacrylate each having 2–4 carbon atoms in the alkyl group and
   (B) about 5–50% by weight of an alkylated melamine formaldehyde cross-linking agent having 1–4 carbon atoms in the alkyl group and in addition to the film-forming constituents 0.1–2% by weight of an acid catalyst.

2. The coating composition of claim 1 containing pigment in addition to the binder in the amount of about 0.1–30% by weight, based on the weight of the binder.

3. The coating composition of claim 2 containing about 0.5–15% by weight based on the weight of the coating composition, of a polyhydroxy functional compound which is a solvent for the film forming constituents and crosslinks with the film forming constituents on heating of the coating composition; the polyhydroxy functional compound is selected from the group consisting of trimethylol ethane, trimethylol propane, trimethylol butane, trimethyl pentanediol, pentaerythritol, pentanediol, diethylene glycol, dipropylene glycol, triethylene glycol, 2-ethyl-1,3-hexane diol, tripropylene glycol and butanediol.

4. The coating composition of claim 2 in which the acrylic polymer consists essentially of
   15–82% by weight of methyl methacrylate, 2–50% by weight of an alkyl methacrylate or an alkyl acrylate each having 2–12 carbon atoms in the alkyl group, and 16–35% by weight of a hydroxy alkyl acrylate or a hydroxy alkyl methacrylate, each having 2–4 carbon atoms in the alkyl group.

5. The coating composition of claim 4 in which the acrylic polymer consists essentially of
   methyl methacrylate, lauryl methacrylate and hydroxy ethyl acrylate;
   the crosslinking agent consists of hexamethoxymethyl melamine and 0.5–15% by weight of a polyhydroxy functional compound of 2-ethyl-1,3-hexane diol.

6. The coating composition of claim 4 in which the acrylic polymer consists essentially of
   methyl methacrylate, 2-ethylhexyl methacrylate and hydroxy ethyl acrylate;
   the crosslinking agent consists essentially of hexamethoxymethyl melamine and 0.5–15% by weight of polyhydroxy functional compound of 2-ethyl-1,3-hexane diol.

7. The coating composition of claim 2 in which the acrylic polymer consists essentially of
   60–80% by weight of methyl methacrylate,
   2–10% by weight of 2-ethyl hexyl acrylate,
   18–30% by weight of hydroxy ethyl acrylate.

8. The coating composition of claim 2 in which the acrylic polymer consists essentially of
   71% by weight of methyl methacrylate,
   4% by weight of 2-ethyl hexyl acrylate, and
   25% by weight of hydroxy ethyl acrylate.

9. The coating composition of claim 2 in which the acrylic polymer consists essentially of
   25–65% by weight of methyl methacrylate,
   15–40% by weight of butyl acrylate,
   20–35% by weight of hydroxy ethyl acrylate.

10. The coating composition of claim 2 in which the acrylic polymer consists essentially of
    50% by weight of methyl methacrylate,
    20% by weight of butyl acrylate, and
    30% by weight of hydroxy ethyl acrylate.

11. The coating composition of claim 2 in which the acrylic polymer consists essentially of
    35% by weight of methyl methacrylate,
    35% by weight of butyl acrylate, and
    30% by weight of hydroxy ethyl acrylate.

12. The coating composition of claim 4 in which the cross-linking agent is hexamethoxymethyl melamine.

13. The coating composition of claim 1 in which the catalyst is an alkyd acid phosphate, phosphoric acid, paratoluene sulfonic acid or an adduct of either of said acids.

14. A high solids coating composition comprising at least 50% by weight of a binder of film-forming constituents and up to 50% by weight of a liquid carrier; in which the film-forming constituents consist essentially of
    (A) about 50–95% by weight of an acrylic polymer having a number average molecular weight determined by gel permeation chromotography of about 500–4,500, a hydroxyl content of about 2–10% by weight, a glass transition temperature of about −20° C. to +20° C. and consisting essentially of
       methyl methacrylate, an alkyl methacrylate or an alkyl acrylate each having 2–12 carbon atoms in the alkyl group and a hydroxy alkyl acrylate or a hydroxy alkyl methacrylate each having 2–4 carbon atoms in the alkyl group; and
    (B) about 5–50% by weight of an alkylated melamine formaldehyde cross-linking agent having 1–4 carbon atoms in the alkyl group and in addition to the film forming constituents about 0.1–2.0% by weight of an acid catalyst.

15. The coating composition of claim 14 containing pigment in addition to the binder in the amount of about 0.1–30% by weight, based on the weight of the binder.

16. The coating composition of claim 15 in which the acrylic polymer contains about 0.1-30% by weight of styrene.

17. The coating composition of claim 15 in which the acrylic polymer consists essentially of
15-82% by weight of methyl methacrylate,
2-50% by weight of an alkyl acrylate having 2-12 carbon atoms in the alkyl group, and
16-35% by weight of a hydroxy alkyl acrylate or a hydroxy alkyl methacrylate, each having 2-4 carbon atoms in the alkyl group.

18. The coating composition of claim 17 in which the acrylic polymer consists essentially of
60-80% by weight of methyl methacrylate,
2-10% by weight of 2-ethyl hexyl acrylate,
18-30% by weight of hydroxy ethyl acrylate.

19. The coating composition of claim 17 in which the acrylic polymer consists essentially of
25-65% by weight of methyl methacrylate,
15-40% by weight of butyl acrylate,
20-35% by weight of hydroxy ethyl acrylate.

20. The coating composition of claim 17 in which the acrylic polymer consists essentially of
50% by weight of methyl methacrylate,
20% by weight of butyl acrylate, and
30% by weight of hydroxy ethyl acrylate.

21. The coating composition of claim 17 in which the acrylic polymer consists essentially of
35% by weight of methyl methacrylate,
35% by weight of butyl acrylate, and
30% by weight of hydroxy ethyl acrylate.

22. The coating composition of claim 16 in which the acrylic polymer consists essentially of
10-20% by weight of styrene,
10-20% by weight of methyl methacrylate,
35-48% by weight of butyl acrylate,
20-30% by weight of hydroxyl ethyl acrylate and
0.1-5% by weight of acrylic acid.

23. The coating composition of claims 17 or 22 in which the cross-linking agent is hexamethoxymethyl melamine.

24. The coating composition of claim 23 in which the catalyst is an alkyl acid phosphate, phosphoric acid, paratoluene sulfonic acid or an adduct of either of said acids.

25. The coating composition of claim 15 containing about 0.5-15% by weight, based on the weight of the coating composition, of a polyhydroxy functional compound which is a solvent for the film forming constituents and will crosslink with the film forming constituents on heating of the coating composition; the polyhydroxy functional compound is selected from the group consisting of trimethylol ethane, trimethylol propane, trimethylol butane, trimethyl pentanediol, pentaerythritol, pentanediol, diethylene glycol, dipropylene glycol, triethylene glycol, 2-ethyl-1,3-hexane diol, tripropylene glycol, butanediol and low molecular weight hydroxyl terminated polyesters.

* * * * *